United States Patent
Ramakrishnan et al.

(10) Patent No.: US 11,212,595 B1
(45) Date of Patent: Dec. 28, 2021

(54) SYSTEM AND METHOD FOR WATERMARKING OVER THE TOP (OTT) CONTENT DELIVERED THROUGH OTT PLATFORM

(71) Applicant: Cognizant Technology Solutions India Pvt. Ltd, Chennai (IN)

(72) Inventors: Venkataraman Ramakrishnan, Bangalore (IN); Harish Kunnath Puthen, Bangalore (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 17/085,286

(22) Filed: Oct. 30, 2020

(30) Foreign Application Priority Data

Aug. 17, 2020 (IN) .............................. 202041035282

(51) Int. Cl.
*H04H 20/14* (2008.01)
*H04N 21/8358* (2011.01)
(Continued)

(52) U.S. Cl.
CPC ... *H04N 21/8358* (2013.01); *H04N 21/23106* (2013.01); *H04N 21/23892* (2013.01); *H04N 21/234309* (2013.01); *H04N 21/2407* (2013.01)

(58) Field of Classification Search
CPC ......... H04N 21/8358; H04N 21/23106; H04N 21/2407; H04N 21/234309; H04N 21/23892
(Continued)

(56) References Cited

U.S. PATENT DOCUMENTS

| 84,629,982 | 6/2013 | Colaitis | |
|---|---|---|---|
| 2011/0129114 A1* | 6/2011 | Colaitis | H04N 19/467 382/100 |

(Continued)

OTHER PUBLICATIONS

Content Identification and Management, Internet https://digitalwatermarkingalliance.org/digital-watermarking-applications/content-identification-and-management/, Sep. 27, 2016.
(Continued)

*Primary Examiner* — Michael B. Pierorazio
(74) *Attorney, Agent, or Firm* — Cantor Colburn LLP

(57) ABSTRACT

A system and a method for watermarking Over The Top (OTT) content delivered through OTT platform is provided. The system comprises an OTT Adaptive Bit Rate Streaming (ABR) engine configured to identify one or more frames associated with one or more OTT content media segments and one or more co-ordinate points associated with the OTT content media segments frames. Further, a unique session specific watermark is dynamically generated based on a received set of instructions from a user for playback of the OTT content media segments. The unique session specific watermark is associated with each user session. The system further comprising a Content Delivery Network/Multi access Edge Computing (CDN/MEC) node and the CDN/MEC node further comprising a watermark embedding unit configured to embed the generated session specific watermark in the identified co-ordinate points associated with the OTT content media segment frames.

28 Claims, 4 Drawing Sheets

(51) Int. Cl.
   *H04N 21/24*     (2011.01)
   *H04N 21/231*    (2011.01)
   *H04N 21/2389*   (2011.01)
   *H04N 21/2343*   (2011.01)

(58) Field of Classification Search
   USPC .......................................................... 725/19
   See application file for complete search history.

(56) References Cited

U.S. PATENT DOCUMENTS

| | | | |
|---|---|---|---|
| 2018/0184160 A1* | 6/2018 | Cain | H04N 21/8358 |
| 2018/0343481 A1* | 11/2018 | Loheide | G06Q 30/0633 |
| 2018/0367637 A1* | 12/2018 | Balazinski | H04L 67/02 |
| 2019/0313161 A1* | 10/2019 | Wilms | H04N 19/114 |

OTHER PUBLICATIONS

Video Watermarking: A Powerful Tool to Stop Piracy; https://www.viaccess-orca.com/blog/video-watermarking, May 14, 2019.
Video-DNA: Large-scale server-side watermarking, 2007 15th European Signal Processing Conference; Internet: https://ieeexplore.ieee.org/document/7099215, Sep. 3-7, 2007.

* cited by examiner

SYSTEM AND METHOD FOR WATERMARKING OVER THE TOP (OTT) CONTENT DELIVERED THROUGH OTT PLATFORM

CROSS REFERENCE TO RELATED APPLICATION

This application is related to and claims the benefit of Indian Patent Application Number 202041035282 filed on Aug. 17, 2020, the contents of which are herein incorporated by reference in their entirety.

FIELD OF THE INVENTION

The present invention relates generally to the field of watermarking OTT content delivered in Over The Top (OTT) platforms. More particularly, the present invention relates to a system and a method for embedding user session based imperceptible or perceptible watermark on OTT content delivered in an OTT video delivery platform.

BACKGROUND OF THE INVENTION

Delivery of audio-video and media content through over the top (OTT) platforms is carried out via internet and provided to a user using an OTT application via a user device. The OTT delivery platform provides video on demand (VOD) and live streaming content to the users. However, the content delivered on the OTT platforms is prone to piracy and the threat of piracy has increased manifold with increased usage of OTT platforms. Instances of piracy may include, but are not limited to, illegal live streaming of sports events and illegal viewing of media content delivered on the OTT platform. Further, the existing techniques are not able to effectively determine the type of content being pirated, location from where the content is being pirated and by whom the content is being pirated.

Typically, it has been observed that the existing techniques for stopping piracy such as, but are not limited to, finger printing technique and watermarking technique embedded on the OTT content are prone to failure, as pirate pigeons may clip the finger print or the watermark embedded on the OTT content before leaking the original copy of the said OTT content. Further, it has been observed that the user session based unique watermarking technique of the content delivered over the OTT platform at the server end is a difficult task, as large number of users may be simultaneously consuming both the Subscription Video on Demand (SVOD) content and live streaming content. Furthermore, it has been observed that watermarking of the OTT content at the server end is difficult because of heavy network bandwidth and increased storage requirements for user session based unique watermarking as it translates to unicasting requirement instead of OTT streaming.

In light of the aforementioned drawbacks, there is a need for a system and a method for efficiently embedding user session based imperceptible or perceptible watermarking on OTT content delivered in an OTT video delivery platform. Further, there is a need for a system and a method for effectively determining the OTT content being pirated, location from where the OTT content is being pirated and by whom the OTT content is being pirated. Furthermore, there is a need for a system and a method for reducing computing load during the watermarked OTT content transmission. Yet further, there is a need for a system and a method for reducing network bandwidth requirements for the watermarked OTT content during transmission and increasing storage efficiency of the watermarked OTT content at the server end.

SUMMARY OF THE INVENTION

In various embodiments of the present invention, a system for watermarking Over The Top (OTT) content delivered through an OTT platform is provided. The system comprising a memory storing program instructions, a processor configured to execute instructions stored in the memory and an OTT Adaptive Bit Rate Streaming (ABR) engine executed by the processor. The OTT Adaptive Bit Rate Streaming (ABR) engine configured to identify one or more frames associated with one or more OTT content media segments and one or more co-ordinate points associated with the OTT content media segments frames. Further, a unique session specific watermark is dynamically generated based on a received set of instructions from a user for playback of the OTT content media segments. The unique session specific watermark is associated with each user session. The system further comprising a Content Delivery Network/Multi access Edge Computing (CDN/MEC) node and the CDN/MEC node further comprising a watermark embedding unit configured to embed the generated session specific watermark in the identified co-ordinate points associated with the OTT content media segment frames.

In various embodiments of the present invention, a method for watermarking Over the Top (OTT) content delivered through an OTT platform is provided. The method is implemented by a processor executing instructions stored in a memory. The method comprising identifying one or more frames associated with one or more OTT content media segments and one or more co-ordinate points associated with the OTT content media segment frames. Further, dynamically generating a unique session specific watermark based on a received set of instructions from a user for playback of the OTT content media segments. The unique session specific watermark is associated with each user session. Finally, embedding the generated session specific watermark in the identified co-ordinate points associated with the OTT content media segment frames.

In various embodiments of the present invention a computer program product is provided. The computer program product comprises a non-transitory computer-readable medium having computer-readable program code stored thereon, the computer-readable program code comprising instructions, that when executed by a processor, causes the processor to identify one or more frames associated with one or more OTT content media segments and one or more co-ordinate points associated with the OTT content media segment frames. Further, a unique session specific watermark is dynamically generated based on a received set of instructions from a user for playback of the OTT content media segments. The unique session specific watermark is associated with each user session. Finally, the generated session specific watermark is embedded in the identified co-ordinate points associated with the OTT content media segment frames.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for efficiently embedding user session based imperceptible or perceptible watermarking on Over The top (OTT) content which is delivered in an OTT platform. The present invention provides for a system and a method for a watermark manifest per content, dynamic user sessions management and achieving user session based watermarking by shift right approach (i.e. at the user end). Further, the present invention provides for a system and a method for determining the type of content being pirated, location from where the content is being pirated and by whom the content is being pirated. Furthermore, the present invention provides for a system and a method for embedding a session specific watermark on the OTT content.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
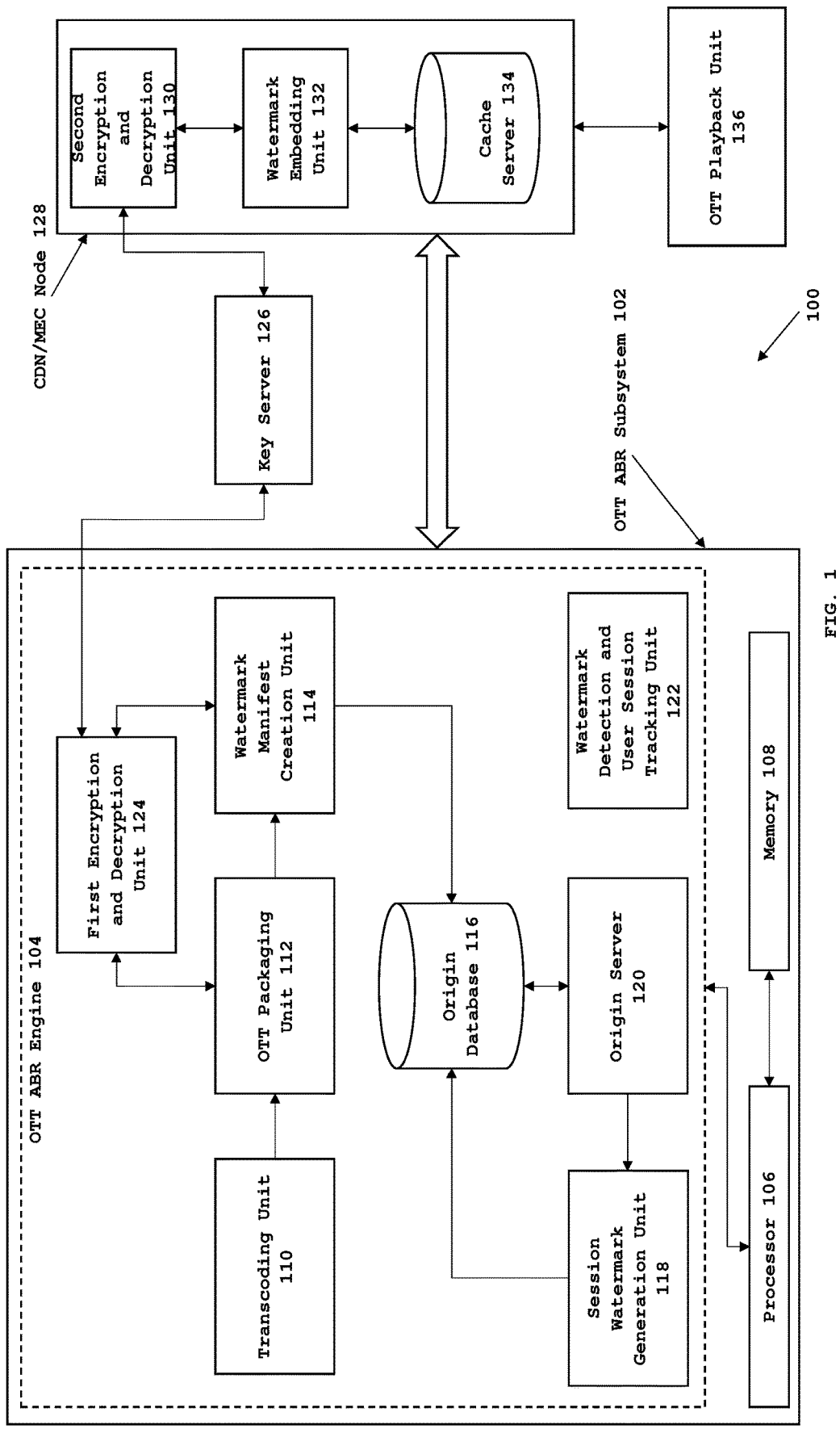
FIG. 1 is a detailed block diagram of a system for watermarking over the top (OTT) content delivered through OTT platform, in accordance with an embodiment of the present invention.

FIG. 1 is a detailed block diagram of a system 100 for watermarking Over The Top (OTT) content delivered through OTT platform, in accordance with various embodiments of the present invention. Referring to FIG. 1, in an embodiment of the present invention, the system 100 comprises an Over The Top (OTT) Adaptive Bit Rate streaming (ABR) subsystem 102, a key server 126, a Content Delivery Network/Multi access Edge Computing (CDN/MEC) node 128 and a OTT playback unit 136. In an embodiment of the present invention, the OTT ABR subsystem 102 communicates with the CDN/MEC node 128 via a communication channel and further with the OTT playback unit 136, which is at the user end. The communication channel may include, but is not limited to, a physical transmission medium, such as, a wire, or a logical connection over a multiplexed medium, such as, a radio channel in telecommunications, computer networking and a network communication protocol (e.g. http, etc.). The examples of radio channel in telecommunications and computer networking may include, but are not limited to, a local area network (LAN), a metropolitan area network (MAN) and a wide area network (WAN). In an embodiment of the present invention, the CDN/MEC node 128 comprises a second encryption and decryption unit 130, a watermark embedding unit 132 and a cache server 134.

In an embodiment of the present invention, the subsystem 102 may be implemented in a cloud computing architecture in which data, applications, services, and other resources are stored and delivered through shared data-centers. In an exemplary embodiment of the present invention, the functionalities of the subsystem 102 are delivered to a user as software as a service (SaaS) over a communication network.

In an embodiment of the present invention, the subsystem 102 is configured to determine frame level details associated with the OTT content such as, but are not limited to, co-ordinate points associated with the frames and send the frame level details to the CDN/MEC node 128 for embedding a watermark in the OTT content at the CDN/MEC node 128. Further, the subsystem 102 is configured to encrypt the frame level details, manage one or more user sessions, generate unique watermark per sessions, store the embedded watermark and further use the stored watermark for tracing back to the user session of a leaked OTT content media segment. In an embodiment of the present invention, the subsystem 102 comprises an OTT ABR engine 104, a processor 106 and a memory 108.

In various embodiments of the present invention, the engine 104 comprises multiple units, which operate in conjunction with each other for generating session specific watermark, which is subsequently embedded in the OTT content delivered through over the top (OTT) platform. The various units of the engine 104 are operated via the processor 106 specifically programmed to execute instructions stored in the memory 108 for executing respective functionality of the units of the engine 104 in accordance with various embodiments of the present invention. In another embodiment of the present invention, the multiple units of the engine 104 may be hosted in a distributed computing environment.

In an embodiment of the present invention, the engine 104 comprises a transcoding unit 110, an OTT packaging unit 112, a watermark manifest creation unit 114, an origin database 116, a session watermark generation unit 118, an origin server 120, a watermark detection and user session tracking unit 122 and a first encryption and decryption unit 124.

In an embodiment of the present invention, one or more OTT content file comprising an audio-video (AV) file is provided to the transcoding unit 110 for converting the OTT content file from one format to another format for making the OTT content file compatible with multiple user devices and generate a transcoded OTT content file. The user devices may include, but are not limited to, smart phone, laptop, computer, tablet, smart television, etc. Therefore, one or more transcoded OTT content file is provided as an output from the transcoding unit 110. In an embodiment of the present invention, the one or more transcoded OTT content files from the transcoding unit 110 are provided as an input to the OTT packaging unit 112 for packaging multiple OTT Adaptive Bit Rate Streaming (ABR) media segments associated with the transcoded OTT content files, to generate packaged OTT content media segments. The OTT packaging unit 112 is configured to transform the multiple OTT ABR media segments associated with the transcoded OTT content files into a sequence of ordered fragments at predefined fragment boundaries for generating the packaged the OTT content media segments. The OTT ABR media segments relate to multiple fragments of the OTT content files. In an embodiment of the present invention, the output from the OTT packaging unit 112 is provided as an input to the watermark manifest creation unit 114.

In an embodiment of the present invention, the watermark manifest creation unit 114 is configured to process the packaged OTT content media segments to identify one or more frames associated with the packaged OTT content media segments and one or more co-ordinate points associated with the packaged OTT content media segments frames for subsequent embedding of a session specific watermark on the identified co-ordinate points. In an exemplary embodiment of the present invention, the watermark manifest creation unit 114 applies one or more feature detection techniques such as, but are not limited to, Scale-Invariant Feature Transform (SIFT) technique, Oriented FAST and rotated BRIEF (ORB) technique and KAZE technique for identifying the frames associated with the packaged OTT content media segments and the co-ordinate points associated with the packaged OTT content media segments frames. In an embodiment of the present invention, the watermark manifest creation unit 114 is further configured to identify one or more intervals between the packaged OTT content media segment frames by applying the feature detection techniques for embedding the watermark. Further, the identified frames associated with the packaged OTT content media segments and the co-ordinate points associated with the packaged OTT content media segments frames are assembled into a watermark manifest (WM) by the watermark manifest creation unit 114. The watermark manifest includes static information which do not require changes per user session associated with the OTT content media segments playback and is represented using a Unique Resource Identifier (URI). Further, the watermark manifest includes data that may be used to determine how and where to embed the session specific watermarks in the OTT content media segments by the watermark embedding unit 132 of the CDN/MEC node 128. In an exemplary embodiment of the present invention, the watermark manifest includes information associated with a protocol compatibility version number, an OTT protocol, event type, and a user session carrier tag for playback. Further, the watermark manifest includes information associated with a URL that identifies a service that provides an encrypted session specific watermark for a given user session of OTT playback. The user-session-carrier-tag may be used with encrypted-session-watermark-service-URL to fetch and embed the session specific watermark in the user session. Further, the watermark manifest includes information to decrypt the watermark for a given user session of OTT playback (e.g. method, initialization vector, key format, etc.), a start marker for watermarking information on segments, media segment identifier URL, and media segment container format. Furthermore, the watermark manifest includes information associated with a number of frames which are to be watermarked in the media segment, frame identifiers, co-ordinate point count representing the number of watermarking points and values of decimal integers representing co-ordinates of watermarking points. In an exemplary embodiment of the present invention, the watermark manifest (WM) is illustrated herein below:

```
#WM-MANIFEST
#WM-X-VERSION:<decimal integer>
#WM-HAS-TYPE: <enumerated-string>
#WM-EVENT-TYPE: <enumerated-string>
#WM-USER-SESSION-CARRIER-TAG:<quoted-string>
#WM-ENCRYPTED-SESSION-WATERMARK-SERVICE-URL:
<quoted-string>
#WM-ENC-KEY:<attribute list>
#WM-MEDIA-SEGMENTS-LIST
  #WM-MEDIA-SEGMENT-URI:<quoted-string>
    #WM-SEGMENT-INFO:
      TYPE=<enumerated-string>,
      CODECS=<quoted-string>,
      FRAMECOUNT=<decimal integer>,
      FRAMES=<decimal integers>
    #WM-FRAME-INFO:
      ID=<decimal integer>,
      FPCOUNT=<decimal integer>,
      FEATUREPOINTS=<decimal integers>
    .
    .
    <#WM-FRAME-INFO block repeats for each frame in
FRAMES attribute>
    .
    #WM-FRAME-INFO:
      ID=<decimal integer>,
      FPCOUNT=<decimal integer>,
      FEATUREPOINTS=<decimal integers>
  <#WM-MEDIA-SEGMENT-URI block repeats for every media
segment in the playlist>
#WM-END-SEGMENTS-LIST
```

In an embodiment of the present invention, the watermark manifest and the packaged OTT content media segments are stored in the origin database 116 along with an OTT manifest and OTT content media segment metadata for subsequent fetching. In an exemplary embodiment of the present invention, the OTT manifests include information associated with playback of the OTT content media segments by the user. The user session carrier tag attribute of the watermark manifest indicates a location associated with the user session details in the OTT manifest. The OTT content media segment metadata may include, but is not limited to, user session ID associated with the OTT content media segments, location of the OTT content media segments playback, etc. The OTT content media segments relate to multiple fragments of the OTT content which is to be played back to the user upon request. Further, access to the watermark manifest, the OTT manifests, the packaged OTT content media segments and OTT content media segment metadata stored in the origin database 116 are provided by the origin server 120, upon receiving an OTT content playback request from the user via the OTT playback unit 136.

In an embodiment of the present invention, the CDN/MEC node 128 communicates with the origin server 120 for communicating with the origin database 116 for fetching the OTT content media segments, the OTT manifest, the watermark manifest and the OTT content media segment metadata in order to cache the fetched OTT content media segments, the OTT manifest, the watermark manifest and the OTT content media segment metadata in the cache server 134 of the CDN/MEC node 128. The caching of the OTT content media segments, the OTT manifest, the watermark manifest and the OTT content media segment metadata aids in providing OTT content media segments to a large number of users with improved playback quality in real-time. In another embodiment of the present invention, if a user requests an OTT content media segment which is not cached in the cache server 134, the CDN/MEC node 128 communicates with the origin database 116 for fetching the requested OTT content media segments and providing to the user and storing in the cache server 134. In an exemplary embodiment of the present invention, the caching of the OTT content media segments, the OTT manifest, the watermark manifest and the OTT content media segment metadata in the cache server 134 is carried out based on one or more pre-defined rules for a pre-defined interval of time. In an exemplary embodiment of the present invention, the pre-defined rule may include that the cached content may not be considered valid after the pre-defined interval of time. In another exemplary embodiment of the present invention, the predefined rule may include setting the cache control to 'no-cache' for OTT master manifests. The OTT master manifests represent data for providing playback of the OTT content media segments to the user (explained herein below).

In operation, in an embodiment of the present invention, a user connected to the OTT playback unit 136 via the user device transmits a request in the form of a set of instructions to the engine 104 via the CDN/MEC node 128 for playback of the OTT content media segments stored in the origin database 116. The playback of the OTT content media segments is representative of one or more user sessions associated with playback of the OTT content. Further, each user session is associated with a user session ID, which is stored in the origin database 116. The OTT playback unit 136 is configured to transmit the set of instructions to the CDN/MEC node 128 for fetching the OTT master manifests associated with the OTT content media segments prior to the playback of the OTT content media segments. The OTT master manifests are stored in the origin database 116. The OTT master manifests representing data for providing playback of the OTT content media segments to the user includes, but is not limited to, type of the fragments of the OTT content media segments, number of the fragments of the OTT content media segments, sequence of the fragments of the OTT content media segments and a Universal Resource Locator (URL) for detecting the watermark manifest. In an embodiment of the present invention, the CDN/MEC node 128, upon receiving instructions from the user, communicates with the engine 104 for invoking the origin server 120 and fetching the stored OTT master manifest from the origin database 116.

In an embodiment of the present invention, the origin database 116 is configured to communicate with the session watermark generation unit 118 upon invocation by the origin server 120, which receives the user instructions. The session watermark generation unit 118 is configured to dynamically generate a unique session specific watermark for each user session, based on the received set of instructions from the user. The generated unique session watermark is therefore a specific watermark associated with each user session. In an exemplary embodiment of the present invention, the session watermark is generated by the session watermark generation unit 118 based on one or more custom session watermark generation algorithms. An exemplary illustration of the session watermark is as follows: session watermark=f(x,y,z), wherein f represents Message Digest 5 (MD5) hash and x, y and z represents parameters which are unique to the OTT content media segments playback session. The session watermark generation unit 118 is configured to connect to the origin database 116 for transmitting and storing the generated unique session specific watermark associated with each user session. In an embodiment of the present invention, the origin server 120 is further configured to communicate with the origin database 116 for fetching the stored OTT master manifest and transmitting to the OTT playback unit 136 via the CDN/MEC node 128. Further, the generated session specific watermark may be cached in the cache server 134 of the CDN/MEC node 128.

In an embodiment of the present invention, subsequent to receiving the OTT master manifest by the OTT playback unit 136, the CDN/MEC node 128 fetches the OTT content media segments, if the OTT content media segments are not cached in the cache server 134; the watermark manifest; and the generated session specific watermark from the origin database 116. The CDN/MEC node 128 communicates with the origin server 120, which further communicates with the origin database 116 for fetching the stored OTT content media segment, the watermark manifest, and the generated session specific watermark. The fetched OTT content media segments, the watermark manifest and the generated session specific watermark are encrypted by the first encryption and decryption unit 124 in the OTT ABR engine 104 for maintaining the security of the OTT content media segment, the watermark manifest and the generated session specific watermark and transmitted to the CDN/MEC node. Further, the encrypted OTT content media segment, the watermark manifest and the generated session specific watermark is stored in the origin database 116 for fetching at a later point in time. In an exemplary embodiment of the present invention, the encryption is carried out based on one or more data encryption techniques, such as, but are not limited to, symmetric and asymmetric cryptography techniques. The encrypted content i.e. the OTT content media segment, the watermark manifest and the generated session specific watermark received at the CDN/MEC node 128 is decrypted by the second encryption and decryption unit 130 at the CDN/MEC node 128. In an embodiment of the present invention, the second encryption and decryption unit 130 decrypts the encrypted content using the symmetric cryptography and fetches a key from the key server 126 based on a pre-defined protocol. The key server 126 is configured to securely provide the key to the second encryption and decryption unit 130 based on the pre-defined protocol for decrypting the encrypted OTT content media segment, the watermark manifest and the generated session specific watermark. In an exemplary embodiment of the present invention, the key server 126 may be located at a local or remote location with respect to the engine 104 and the CDN/MEC node 128 respectively.

In an embodiment of the present invention, the second encryption and decryption unit 130 of the CDN/MEC node 128, after decrypting the encrypted OTT content media segment, the watermark manifest and the generated session specific watermark, is configured to transmit the decrypted content to the watermark embedding unit 132 of the CDN/MEC node 128. In an embodiment of the present invention, the watermark embedding unit 132 is configured to process the decrypted OTT content media segment, the watermark manifest and the generated session specific watermark and subsequent to the processing, determines the identified frames associated with the OTT content media segments and the co-ordinate points associated with the OTT content media segments frames based on the processing of the watermark manifest. Further, the watermark embedding unit 132 embeds the session specific watermark at the co-ordinate points in all the identified frames associated with the OTT content media segments. Further, the session specific watermark is embedded in each user session associated with the playback of the OTT content media segments.

In an exemplary embodiment of the present invention, the watermark embedding unit 132 is configured to implement techniques, such as, but are not limited to, a Discrete Cosine Transform (DCT) technique, a Discrete Wavelet Transform (DWT) technique and a steganography technique for embedding the co-ordinate points associated with the OTT content media segments frames with the session specific watermark. Further, the watermark embedding unit 132 is configured to provide the watermark embedded OTT content media segments just-in-time for delivery to the OTT playback unit 136, subsequent to session specific watermarking for playback on the user device. In an embodiment of the present invention, the OTT content media segment, if encrypted is decrypted and re-encrypted by the second encryption and decryption unit 130 after embedding the session specific watermark and provided to the OTT playback unit 136.

In an embodiment of the present invention, the watermark detection and user session tracking unit 122 is configured to operate independently in the OTT ABR engine 104 and is configured to trace the user playback session associated with a leaked/pirated OTT content media segment. The user plays back the OTT content media segments via the OTT playback unit 136 and a segment of the played back OTT content segment media segments is uploaded for analysis in the watermark detection and user session tracking unit 122 for determining leaked OTT content media segment associated with the played back OTT content media segment. The watermark detection and user session tracking unit 122 is configured to analyze the loaded segment of the OTT content media segment for extracting the associated session specific watermark from the frames of the OTT content media segments based on the session specific watermark embedding techniques. The segment of the leaked OTT content media segment may be of a pre-defined time period. The watermark detection and user session tracking unit 122 is further configured to search the extracted session specific watermark in the origin database 116 for tracing the watermark manifest and session specific watermark back to the user session from where the OTT content media segment may have leaked. The watermark detection and user session tracking unit 122 is configured to identify the user session ID associated with the leaked OTT content media segment for tracing the session specific watermark back to the user session based on analysis of the extracted session specific watermark from the origin database 116 for identifying the location of the user and identity of the user that may have leaked the OTT content media segment. In an exemplary embodiment of the present invention, the watermark detection and user session tracking unit 122 is configured to analyze the extracted session specific watermark based on processing of the leaked OTT content media segments using the co-ordinate points detection techniques such as, but not limited to, the SIFT technique, the ORB technique and the KAZE technique and subsequently carrying out a reverse process of techniques used for embedding the co-ordinate points associated with the OTT content media segments with the session specific watermark. The reverse process techniques include, but are not limited to, a reverse DCT technique, a reverse DWT technique and a reverse steganography technique.

Figure 2:
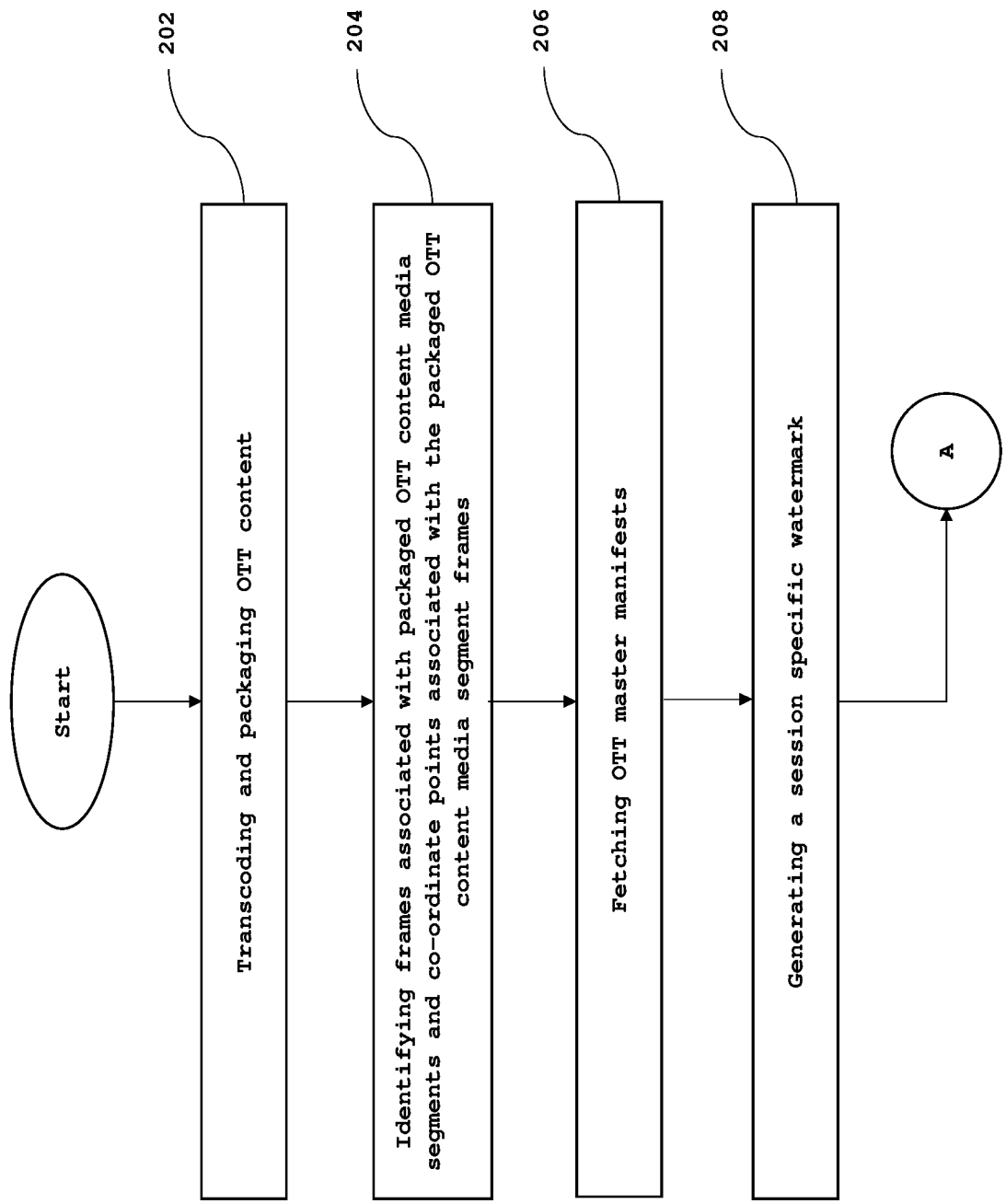
FIG. 2 and FIG. 2A is a flowchart illustrating a method for watermarking over the top (OTT) content delivered through OTT platform, in accordance with an embodiment of the present invention.
Figure 2A:
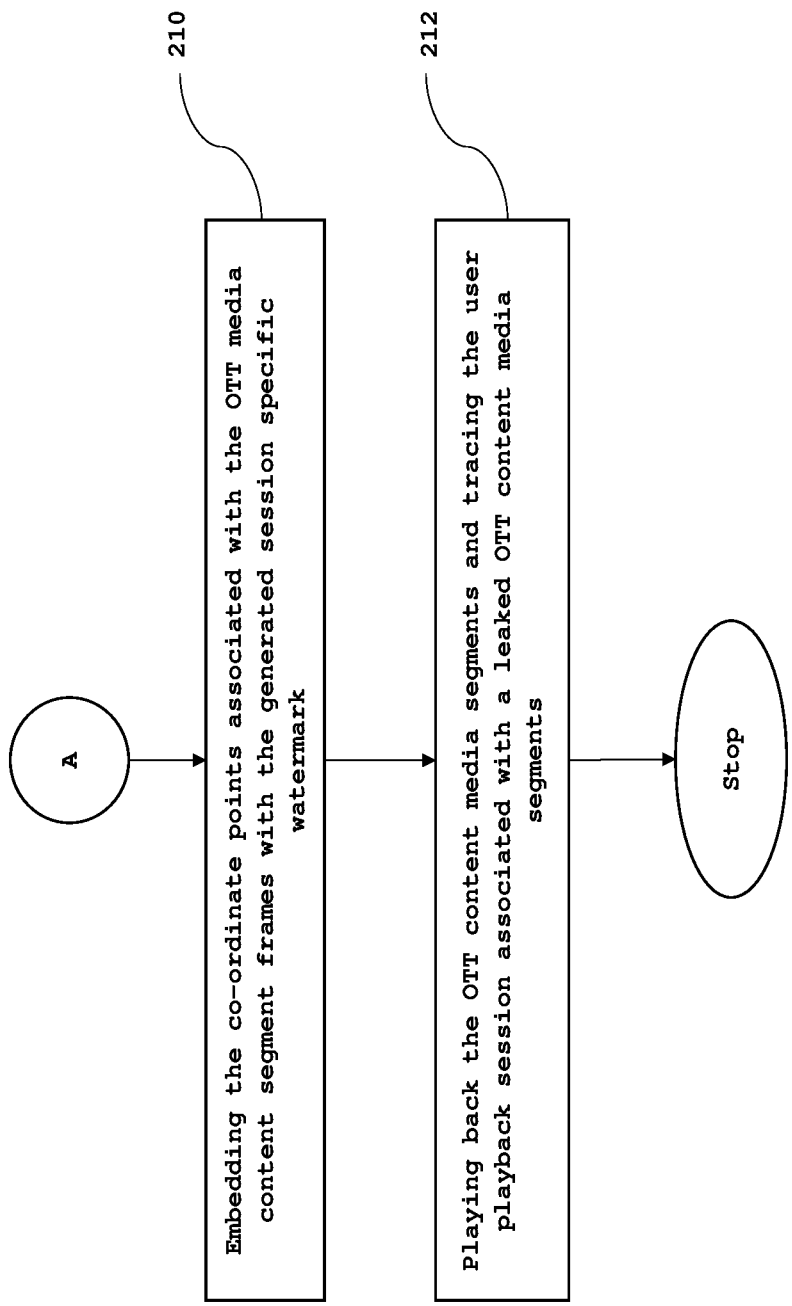

FIG. 2 and FIG. 2A is a flowchart illustrating a method for watermarking Over The Top (OTT) content delivered through OTT platform, in accordance with various embodiments of the present invention.

At step 202, OTT content is transcoded and packaged. In an embodiment of the present invention, one or more OTT content file comprising an audio-video (AV) file is converted from one format to another format for making the OTT content file compatible with multiple user devices to generate a transcoded OTT content file. The user devices may include, but are not limited to, smart phone, laptop, computer, tablet, smart television, etc. In an embodiment of the present invention, multiple OTT Adaptive Bit Rate Streaming (ABR) media segments associated with the transcoded OTT content files are packaged to generate packaged OTT content media segments. The multiple OTT ABR media segments associated with the transcoded OTT content files are transformed into a sequence of ordered fragments at pre-defined fragment boundaries for generating the packaged the OTT content media segments. The OTT ABR media segments relate to multiple fragments of the OTT content files.

At step 204, frames associated with packaged OTT content media segments and co-ordinate points associated with the packaged OTT content media segment frames are identified. In an embodiment of the present invention, one or more frames and one or more co-ordinate points associated with the packaged OTT content media segments frames are identified based on processing of the assembled OTT content media segments for subsequent embedding of a watermark on the identified co-ordinate points. In an exemplary embodiment of the present invention, one or more feature detection techniques are applied such as, but are not limited to, Scale-Invariant Feature Transform (SIFT) technique, Oriented FAST and rotated BRIEF (ORB) technique and KAZE technique for identifying the frames associated with the packaged OTT content media segments and the co-ordinate points associated with the packaged OTT content media segments frames. In an embodiment of the present invention, one or more intervals between the packaged OTT content media segment frames are identified by applying the feature detection techniques for embedding the watermark. Further, the identified frames associated with the packaged OTT content media segments and the co-ordinate points associated with the packaged OTT content media segments frames are assembled into a watermark manifest. The watermark manifest includes static information which do not require changes per user session associated with the OTT content media segments playback and is represented using a Unique Resource Identifier (URI). Further, the watermark manifest includes data that may be used to determine how and where to embed the session specific watermarks in the OTT content media segments. In an exemplary embodiment of the present invention, the watermark manifest includes information associated with a protocol compatibility version number, an OTT protocol, event type, and a user session carrier tag for playback. Further, the watermark manifest includes information associated with a URL that identifies a service that provides an encrypted session specific watermark for a given user session of OTT playback. The user-session-carrier-tag may be used with encrypted-session-watermark-service-URL to fetch and embed the session specific watermark in the user session. Further, the watermark manifest includes information to decrypt the watermark for a given user session of OTT playback (e.g. method, initialization vector, key format, etc.). Further, the watermark manifest includes information associated with a start marker for watermarking information on segments, media segment identifier URL, media segment container format. Furthermore, the watermark manifest includes information associated with a number of frames to be watermarked in the media segment, frame identifier, co-ordinate point count representing the number of watermarking points and values of decimal integers representing co-ordinates of watermarking points.

In an embodiment of the present invention, the watermark manifest and the packaged OTT content media segments are stored in an origin database along with an OTT manifests and OTT content media segment metadata for subsequent fetching. In an exemplary embodiment of the present invention, the OTT manifests includes information associated with playback of the OTT content media segments by the user. The user session carrier tag attribute of the watermark manifest indicates a location associated with the user session details in the OTT manifest. The OTT content media segment metadata may include, but is not limited to, user session ID associated with the OTT content media segments, location of the OTT content media segments playback, etc. The OTT content media segments relate to multiple fragments of the OTT content which is to be played back to the user upon request. Further, access to the watermark manifest, the OTT manifests, the packaged OTT content media segments and OTT content media segment metadata stored in the origin database are provided by an origin server upon receiving an OTT content playback request from the user.

In an embodiment of the present invention, the OTT content media segments, the OTT manifest, the watermark manifest and the OTT content media segment metadata are fetched from the origin database in order to cache the fetched OTT content media segments, the OTT manifest, the watermark manifest and the OTT content media segment metadata in a cache server present in a CDN/MEC node. In another embodiment of the present invention, if a user requests an OTT content media segment which is not cached in the cache server, the requested OTT content media segments are fetched from the origin server and provided to the user and storing in the cache server. In an exemplary embodiment of the present invention, the caching of the OTT content media segments, the OTT manifest, the watermark manifest and the OTT content media segment metadata in the cache server is carried out based on one or more pre-defined rules for a pre-defined interval of time. In an exemplary embodiment of the present invention, the pre-defined rule may include that the cached content may not be considered valid after the pre-defined interval of time. In another exemplary embodiment of the present invention, the predefined rule may include setting the cache control to 'no-cache' for OTT master manifests. The OTT master manifests represent data for providing playback of the OTT content media segments to the user.

At step 206, OTT master manifests are fetched. In an embodiment of the present invention, a user connected via a user device transmits a request in the form of a set of instructions for playback of the OTT content media segments stored in the origin database. The playback of the OTT content media segments is representative of one or more user sessions associated with playback of the OTT content. Further, each user session is associated with a user session ID, which is stored in the origin database. The set of instructions are used for fetching the OTT master manifests, from origin database, associated with the OTT content media segments prior to the playback of the OTT content media segments. The OTT master manifests representing data for providing playback of the OTT content media segments to the user includes, but is not limited to, type of the fragments of the OTT content media segments, number of the fragments of the OTT content media segments, sequence of the fragments of the OTT content media segments and a Universal Resource locator (URL) for detecting the watermark manifest. In an embodiment of the present invention, the CDN/MEC node, upon receiving instructions from the user, invokes the origin server for fetching the stored OTT master manifest from the origin database.

At step 208, a session specific watermark is generated. In an embodiment of the present invention, a unique session specific watermark is dynamically generated for each user session, based on the receiving set of instructions from the user. The generated unique session watermark is therefore a specific watermark associated with each user session. In an exemplary embodiment of the present invention, the session watermark is generated by the session watermark generation unit 118 based on one or more custom session watermark generation algorithm. An exemplary illustration of the generated session watermark is as follows: session watermark=f (x,y,z), wherein f represents Message Digest 5 (MD5) hash and x, y and z represents parameters which are unique to the OTT content media segments playback session. The generated unique session specific watermark associated with each user session are transmitted and stored in the origin database. In an embodiment of the present invention, the origin server is further configured to communicate with the origin database for fetching the stored OTT master manifest and transmitting to the CDN/MEC node. Further, the generated session specific watermark may be cached in the cache server of the CDN/MEC node.

In an embodiment of the present invention, subsequent to receiving the OTT master manifest, the CDN/MEC node to fetches the OTT content media segments, if the OTT content media segments are not cached in the cache server; the watermark manifest; and the generated session specific watermark from the origin database. The fetched OTT content media segments, the watermark manifest and the generated session specific watermark are encrypted and transmitted to the CDN/MEC node for maintaining the security of the OTT content media segment, the watermark manifest and the generated session specific watermark. Further, the encrypted OTT content media segment, the watermark manifest and the generated session specific watermark is stored in the origin database for fetching at a later point in time. In an exemplary embodiment of the present invention, the encryption is carried out based on one or more data encryption techniques, such as, but are not limited to, symmetric and asymmetric cryptography techniques. The encrypted content i.e. the OTT content media segment, the watermark manifest and the generated session specific watermark received at the CDN/MEC node, is decrypted. In an embodiment of the present invention, using a symmetric cryptography, a key is securely provided based on a pre-defined protocol for decrypting the encrypted OTT content media segment, the watermark manifest and the generated session specific watermark.

At step 210, co-ordinate points associated with the OTT media content segment frames are embedded with the generated session specific watermark. In an embodiment of the present invention, the received decrypted OTT content media segments, the watermark manifest and the generated session specific watermark are processed and the identified frames associated with the OTT content media segments and the co-ordinate points associated with the OTT content media segments frames are determined based on the processing of the watermark manifest. Further, the session specific watermark is embedded at the co-ordinate points in all the identified frames associated with the OTT content media segments. Further, the session specific watermark is embedded in each user session associated with the playback of the OTT content media segments. In an exemplary embodiment of the present invention, techniques, such as, but are not limited to, a Discrete Cosine Transform (DCT) technique, a Discrete Wavelet Transform (DWT) technique and a steganography technique are applied for embedding the co-ordinate points associated with the OTT content media segments frames with the session specific watermark.

Further, the watermark embedded OTT content media segments are provided just-in-time subsequent to session specific watermarking for playback on the user device. In an embodiment of the present invention, the OTT content media segment, if encrypted is decrypted and re-encrypted after embedding the session specific watermark.

At step 212, OTT content media segments are played back and the played back session associated with leaked OTT content media segments is traced. In an embodiment of the present invention, the user plays back the OTT content media segment and a segment of the played back OTT content media segment is analyzed for determining leaked OTT content media segments associated with the played back OTT content media segments. The segment of the OTT content media segment is analyzed for extracting the associated session specific watermark from the frames of the OTT content media segments based on the session specific watermark embedding techniques. The segment of the leaked OTT content media segment may be of a pre-defined time period. The extracted session specific watermark is searched in the origin database for tracing the session specific watermark back to the user session from where the OTT content media segment is leaked. The user session ID associated with the leaked OTT content media segment is identified for tracing the session specific watermark back to the user session based on analysis of the extracted session specific watermark from the origin database for identifying the location of the user and identity of the user that may have leaked the OTT content media segment. In an exemplary embodiment of the present invention, the extracted session specific watermark is analyzed based on processing of the leaked OTT content media segments using the co-ordinate points detection techniques such as, but not limited to, the SIFT technique, the ORB technique and the KAZE technique and subsequently carrying out a reverse process of techniques used for embedding the co-ordinate points associated with the OTT content media segments with the session specific watermark. The reverse process techniques include, but are not limited to, a reverse DCT technique, a reverse DWT technique and a reverse steganography technique.

Advantageously, in accordance with various embodiments of the present invention, the present invention efficiently embeds imperceptible/perceptible session specific watermark on OTT content media segment (i.e. AV content) delivered in an OTT platform. The present invention is configured to provide watermark manifest creation, which is a one-time process, during the OTT ABR processing of the OTT content. Further, the session specific watermark embedding process is carried out at the CDN/MEC nodes 128 which are closer to the user, thereby reducing the compute load on the origin server 120. The present invention reduces the network bandwidth requirements for the session specific OTT content media segments transmission from origin server 120 as the session specific watermarking process is carried out in the CDN/MEC nodes 128 which are closer to the user. Further, the present invention implements the watermarking process at the CDN/MEC node 128 using a single copy of the OTT content media segment at the origin server 120 instead of using multiple copies of the OTT content, thereby increasing storage efficiency. Furthermore, the present invention is agnostic of the OTT content media segment streaming protocols that are used to provide the OTT content and as such, the system 100 is compatible and integrable with different OTT content media segment streaming protocols. Yet further, the present invention efficiently detects watermark in the leaked OTT content media segment as it requires only few frames of the leaked OTT content media segment to detect the watermark for tracing back to the user session. Therefore, the present invention efficiently determines the OTT content media segment being pirated, location from where the OTT content media segment is being pirated and by whom the OTT content media segment is being pirated. Further, advantageously, the session specific watermark is not altered when subjected to various processes such as, analog-to-digital conversions, multiple transcodings, skewed captures, resolution scaling processes etc. in accordance with various embodiments of the present invention.

Figure 3:
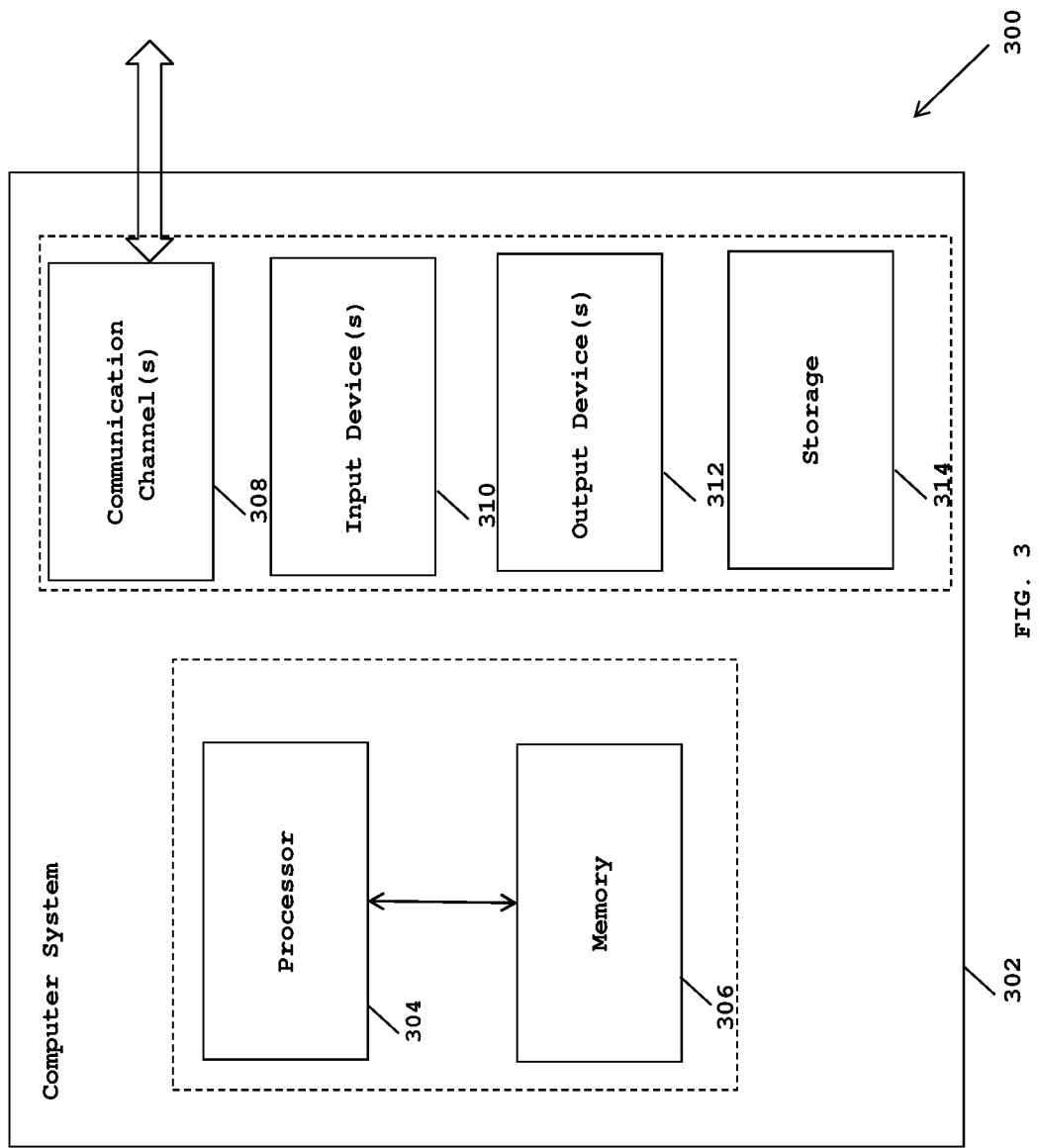
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for watermarking Over The Top (OTT) content delivered through an OTT platform, the system comprising:
    a memory storing program instructions;
    a processor configured to execute instructions stored in the memory; and
    an OTT Adaptive Bit Rate Streaming (ABR) engine executed by the processor and configured to:
        identify one or more frames associated with one or more OTT content media segments and one or more co-ordinate points associated with the OTT content media segments frames, wherein the identified frames associated with the OTT content media segments and the co-ordinate points associated with the OTT content media segments frames are assembled into a watermark manifest; and
        dynamically generate a unique session specific watermark based on a received set of instructions from a user for playback of the OTT content media segments, wherein the unique session specific watermark is associated with each user session;
    and
    a Content Delivery Network/Multi access Edge Computing (CDN/MEC) node comprising a watermark embedding unit configured to embed the generated session specific watermark in the identified co-ordinate points associated with the OTT content media segment frames,
    wherein the OTT master manifest is received by an OTT playback unit, the CDN/MEC node fetches from an origin database the watermark manifest, the generated session specific watermark and the OTT content media segments, if the OTT content media segments are not cached in a cache server, and wherein the fetched watermark manifest, the generated session specific watermark and the OTT content media segments are encrypted by a first encryption and decryption unit in the OTT ABR engine for maintaining security of the watermark manifest, the generated session specific watermark and the OTT content media segments and transmitted to the CDN/MEC node, and wherein the encryption is carried out based on a symmetric and an asymmetric cryptography technique.

2. The system as claimed in claim 1, wherein the system comprises a transcoding unit executed by the processor and configured to convert one or more OTT content files from one format to another format to generate one or more transcoded OTT content media segments; and
    an OTT packaging unit executed by the processor and configured to package multiple OTT ABR media segments associated with the transcoded OTT content media segments to generate one or more packaged OTT content media segments.

3. The system as claimed in claim 1, wherein a watermark manifest creation unit in the OTT ABR engine is configured to apply one or more feature detection techniques on the OTT content media segments for identifying the frames associated with the OTT content media segments and the co-ordinate points associated with the OTT content media segments frames, the feature detection techniques comprises a Scale-Invariant Feature Transform (SIFT) technique, an Oriented FAST and rotated BRIEF (ORB) technique and a KAZE technique.

4. The system as claimed in claim 1, wherein the watermark manifest includes static information which do not require changes with respect to different user sessions associated with the OTT content media segments playback and is represented using a Unique Resource Identifier (URI).

5. The system as claimed in claim 4, wherein the watermark manifest comprises information associated with a protocol compatibility version number, an OTT protocol, event type, user session carrier tag for playback, a URI that identifies a service that provides an encrypted session specific watermark for a given user session of OTT playback, watermark for a given user session of OTT playback to decrypt the watermark, start marker for watermarking information on segments, media segment identifier URL, media segment container format, number of frames to be watermarked in the media segment, frame identifier, co-ordinate point count representing the number of watermarking points and values of decimal integers representing co-ordinates of watermarking points.

6. The system as claimed in claim 4, wherein the watermark manifest, the OTT content media segments, the generated session specific watermark, an OTT manifest representing information associated with playback of the OTT content media segments and OTT content media segments metadata are stored in the origin database in the OTT ABR engine, and wherein the watermark manifest, the OTT manifest, the OTT content media segments, the generated session specific watermark and the OTT content media segment metadata are cached in the cache server in the CDN/MEC node, the caching of the OTT content media segments in the cache server is carried out based on one or more pre-defined rules for a pre-defined interval of time.

7. The system as claimed in claim 1, wherein an OTT playback unit is configured to receive a set of instructions, via a user device, and subsequent to fetching of the OTT master manifests associated with the OTT content media segments, transmit the set of instructions to the OTT ABR engine via the CDN/MEC node for playback of the OTT content media segments stored in the origin database in the OTT ABR engine, and wherein one or more OTT master manifests associated with the OTT content media segments are fetched from the origin database prior to the playback of the OTT content media segments.

8. The system as claimed in claim 1, wherein the OTT master manifests represent data for providing playback of the OTT content media segments to the user comprising at least: a type of the fragments of the OTT content media segments, a number of the fragments of the OTT content media segments, a sequence of the fragments of the OTT content media segments and a universal resource locator (URL) for detecting a watermark manifest.

9. The system as claimed in claim 1, wherein the playback of the OTT content media segments is representative of one or more user sessions.

10. The system as claimed in claim 1, wherein the encrypted watermark manifest, the generated session specific watermark and the OTT content media segments are received at the CDN/MEC node and decrypted by a second encryption and decryption unit in the CDN/MEC node based on a key received from a key server based on a pre-defined protocol.

11. The system as claimed in claim 10, wherein the decrypted watermark manifest, the generated session specific watermark and the OTT content media segments are provided to the watermark embedding unit for processing and determining the identified frames associated with the OTT content media segments and the co-ordinate points associated with the OTT content media segments frames for embedding the session specific watermark in the co-ordinate points associated with the OTT content media segments frames.

12. The system as claimed in claim 1, wherein the watermark embedding unit is configured to implement at least one of: a Discrete Cosine Transform (DCT) technique, a Discrete Wavelet Transform (DWT) technique and a steganography technique for embedding the session specific watermark in the co-ordinate points associated with the OTT content media segment frames.

13. The system as claimed in claim 1, wherein the OTT ABR engine comprises a watermark detection and user session tracking unit executed by the processor and configured to trace the user playback session associated with a leaked OTT content media segment.

14. The system as claimed in claim 13, wherein a segment of a played back OTT content media segment is uploaded for analysis in the watermark detection and user session tracking unit for determining the leaked OTT content media segment associated with the played back OTT content media segment, and wherein the session specific watermark is extracted from the frames of the OTT content media segment based on session specific watermark embedding techniques.

15. The system as claimed in claim 14, wherein the watermark detection and user session tracking unit is configured to search the extracted session specific watermark in the origin database in the OTT ABR engine for tracing the session specific watermark back to a user session from where the OTT content media segment is leaked.

16. The system as claimed in claim 15, wherein the watermark detection and user session tracking unit is configured to identify a user session ID associated with the leaked OTT content media segment for tracing the session specific watermark back to the user session based on analyzing the extracted session specific watermark from the origin database for identifying a location of the user and an identity of the user associated with the leaked OTT content media segment.

17. The system as claimed in claim 16, wherein the watermark detection and user session tracking unit is configured to analyze the extracted session specific watermark based on processing of the leaked OTT content media segments using one or more co-ordinate points detection techniques comprising a SIFT technique, a ORB technique and a KAZE technique and subsequently carrying out a reverse process of techniques used for embedding the co-ordinate points associated with the OTT content media segments frames with the session specific watermark, and wherein the reverse process techniques comprises at least: a reverse DCT technique, a reverse DWT technique and a reverse steganography technique.

18. A method for watermarking Over the Top (OTT) content delivered through an OTT platform, wherein the method is implemented by a processor executing instructions stored in a memory, the method comprising:
identifying one or more frames associated with one or more OTT content media segments and one or more co-ordinate points associated with the OTT content media segment frames, wherein the identified frames associated with the OTT content media segments and the co-ordinate points associated with the OTT content media segments frames are assembled into a watermark manifest;
dynamically generating a unique session specific watermark based on a received set of instructions from a user for playback of the OTT content media segments, wherein the unique session specific watermark is associated with each user session; and
embedding the generated session specific watermark in the identified co-ordinate points associated with the OTT content media segment frames, wherein one or more OTT master manifests associated with the OTT content media segments are fetched, and wherein if the OTT content media segments are not cached, the watermark manifest, the generated session specific watermark and the OTT content media segments are fetched, and wherein the fetched watermark manifest, the generated session specific watermark and the OTT content media segments are encrypted for maintaining security of the watermark manifest, the generated session specific watermark and the OTT content media segments, and wherein the encryption is carried out based on a symmetric and an asymmetric cryptography technique.

19. The method as claimed in claim 18, wherein one or more OTT content files are converted from one format to another format to generate one or more transcoded OTT content media segments, and wherein multiple OTT Adaptive Bit Rate Streaming (ABR) media segments associated with the transcoded OTT content media segments are packaged to generate one or more packaged OTT content media segments.

20. The method as claimed in claim 18, wherein the watermark manifest includes static information which do not require changes with respect to different user sessions associated with the OTT content media segments playback and is represented using a Unique Resource Identifier (URI).

21. The method as claimed in claim 18, wherein the watermark manifest, the OTT content media segments, the generated session specific watermark, an OTT manifest representing information associated with playback of the OTT content media segments and OTT content media segments metadata are cached subsequent to the fetching of the OTT master manifests associated with the OTT content media segments, and wherein the caching is done based on one or more pre-defined rules for a pre-defined interval of time.

22. The method as claimed in claim 18, wherein the encrypted watermark manifest, the generated session specific watermark and the OTT content media segments are decrypted based on a key, and wherein the key is received based on a pre-defined protocol.

23. The method as claimed in claim 22, wherein the decrypted watermark manifest, the generated session specific watermark and the OTT content media segments are processed and the identified frames associated with the OTT content media segments and the co-ordinate points associated with the OTT content media segments frames are determined for embedding the session specific watermark in the co-ordinate points associated with the OTT content media segments frames.

24. The method as claimed in claim 18, wherein the user playback session associated with a leaked OTT content media segment is traced.

25. The method as claimed in claim 24, wherein a segment of a played back OTT content media segment is analyzed for determining the leaked OTT content media segment associated with the played back OTT content media segment, and wherein the session specific watermark is extracted from the frames of the OTT content media segment based on session specific watermark embedding techniques.

26. The method as claimed in claim 25, wherein the extracted session specific watermark is tracked back to a user session from where the OTT content media segment is leaked.

27. The method as claimed in claim 26, wherein a user session ID associated with the leaked OTT content media segment is identified for tracing the session specific watermark back to the user session based on analyzing the extracted session specific watermark for identifying a location of the user and an identity of the user associated with the leaked OTT content media segment.

28. A computer program product comprising:
a non-transitory computer-readable medium having computer-readable program code stored thereon, the computer-readable program code comprising instructions, that when executed by a processor, causes the processor to:
identify one or more frames associated with one or more OTT content media segments and one or more co-ordinate points associated with the OTT content media segment frames, wherein the identified frames associated with the OTT content media segments and the co-ordinate points associated with the OTT content media segments frames are assembled into a watermark manifest;
dynamically generate a unique session specific watermark based on a received set of instructions from a user for playback of the OTT content media segments, wherein the unique session specific watermark is associated with each user session; and
embed the generated session specific watermark in the identified co-ordinate points associated with the OTT content media segment frames, wherein one or more OTT master manifests associated with the OTT content media segments are fetched, and wherein if the OTT content media segments are not cached, the watermark manifest, the generated session specific watermark and the OTT content media segments are fetched, and wherein the fetched watermark manifest, the generated session specific watermark and the OTT content media segments are encrypted for maintaining security of the watermark manifest, the generated session specific watermark and the OTT content media segments, and wherein the encryption is carried out based on a symmetric and an asymmetric cryptography technique.

* * * * *